US012696265B2

(12) United States Patent
Wong et al.

(10) Patent No.: US 12,696,265 B2
(45) Date of Patent: Jul. 28, 2026

(54) COMMUNICATIONS DEVICES, INFRASTRUCTURE EQUIPMENT AND METHODS

(71) Applicant: Sony Group Corporation, Tokyo (JP)

(72) Inventors: Shin Horng Wong, Basingstoke (GB); Martin Warwick Beale, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 586 days.

(21) Appl. No.: 17/421,381

(22) PCT Filed: Jan. 10, 2020

(86) PCT No.: PCT/EP2020/050573
§ 371 (c)(1),
(2) Date: Jul. 8, 2021

(87) PCT Pub. No.: WO2020/144346
PCT Pub. Date: Jul. 16, 2020

(65) Prior Publication Data
US 2022/0086873 A1      Mar. 17, 2022

(30) Foreign Application Priority Data
Jan. 10, 2019     (EP) ..................................... 19151270

(51) Int. Cl.
*H04W 72/1268*          (2023.01)
*H04L 1/1812*           (2023.01)
(Continued)

(52) U.S. Cl.
CPC ....... *H04W 72/1268* (2013.01); *H04L 1/1819* (2013.01); *H04L 5/0007* (2013.01);
(Continued)

(58) Field of Classification Search
CPC ............. H04W 72/1268; H04W 72/23; H04W 72/0446; H04W 92/12; H04L 1/1819; H04L 5/0007; H04L 5/0051
See application file for complete search history.

(56) References Cited

U.S. PATENT DOCUMENTS

2012/0140717 A1    6/2012  Zhu
2018/0109276 A1    4/2018  Wong et al.
(Continued)

FOREIGN PATENT DOCUMENTS

CN        108293248 A      7/2018
CN        108604975 A      9/2018
(Continued)

OTHER PUBLICATIONS

International Search Report and Written Opinion mailed on Jun. 23, 2020, received for PCT Application PCT/EP2020/050573, Filed on Jan. 10, 2020, 22 pages.
(Continued)

*Primary Examiner* — Noel R Beharry
(74) *Attorney, Agent, or Firm* — XSENSUS, LLP

(57) ABSTRACT

A communications device configured to transmit data to an infrastructure equipment of a wireless communications network is provided. The communications device comprises transceiver circuitry configured to transmit signals and receive signals via a wireless access interface provided by the wireless communications network, and controller circuitry configured to control the transceiver circuitry, to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the
(Continued)

wireless access interface and a second segment located in a second time divided slot of the wireless access interface.

19 Claims, 8 Drawing Sheets

(51) Int. Cl.
| | |
|---|---|
| *H04L 5/00* | (2006.01) |
| *H04W 72/0446* | (2023.01) |
| *H04W 72/23* | (2023.01) |
| *H04W 92/12* | (2009.01) |

(52) U.S. Cl.
CPC ....... *H04L 5/0051* (2013.01); *H04W 72/0446* (2013.01); *H04W 72/23* (2023.01); *H04W 92/12* (2013.01)

(56) References Cited

U.S. PATENT DOCUMENTS

| | | | | |
|---|---|---|---|---|
| 2018/0175993 | A1* | 6/2018 | Onggosanusi ........ | H04L 5/0057 |
| 2019/0150198 | A1* | 5/2019 | Sun ....................... | H04L 5/0082 |
| | | | | 370/329 |
| 2020/0136783 | A1* | 4/2020 | Takeda .................. | H04L 5/0055 |
| 2020/0228250 | A1* | 7/2020 | Cheng ................... | H04L 1/1835 |
| 2020/0374034 | A1* | 11/2020 | Xu ......................... | H04L 1/0057 |
| 2021/0176776 | A1* | 6/2021 | Choi ..................... | H04L 1/1819 |
| 2021/0266106 | A1* | 8/2021 | Yan ....................... | H04L 1/1822 |
| 2021/0307036 | A1* | 9/2021 | Myung ............. | H04W 72/1268 |
| 2022/0052832 | A1* | 2/2022 | Ersbo .................... | H04L 1/1819 |

FOREIGN PATENT DOCUMENTS

| | | |
|---|---|---|
| IN | 201617004968 A | 8/2016 |
| IN | 201817023996 A | 11/2018 |

OTHER PUBLICATIONS

Intel Corporation, "On PUSCH Enhancements for eURLLC", 3GPP TSG RAN WG1 Meeting #95, R1-1812503, Nov. 12-16, 2018, pp. 1-5.

CATT, "Discussion on Potential Enhancements to PUSCH", 3GPP TSG RAN WG1 Meeting #95, R1-1812630, Nov. 12-16, 2018, 3 pages.

Ericsson, "PUSCH Enhancements for NR URLLC", 3GPP TSG-RAN WG1 Meeting #95, R1-1812155, Nov. 12-16, 2018, pp. 1-7.

ZTE, "Grant-Based PUSCH Enhancements", 3GPP TSG RAN WG1 Meeting #95, R1-1812386, Nov. 12-16, 2018, pp. 1-3.

OPPO, "PUSCH Enhancement for URLLCC", 3GPP TSG RAN WG1 Meeting #95, R1-1812817, Nov. 12-16, 2018, 2 pages.

Holma et al., "LTE for UMTS OFDMA and SC-FDMA Based Radio Access", John Wiley and Sons, 2009, pp. 25-27.

NTT Docomo Inc., "Revised WID on New Radio Access Technology", 3GPP TSG RAN Meeting #78, RP-172834, Dec. 18-21, 2017, 11 pages.

3GPP, "Study on Scenarios and Requirements for Next Generation Access Technologies; (Release 14)" 3GPP TR 38.913 V14.3.0, Jun. 2017, pp. 1-39.

Huawei et al., "Study on Physical Layer Enhancements for NR Ultra-Reliable and Low Latency Communication (URLLC)", 3GPP TSG-RAN#81, RP-182089, Sep. 10-13, 2018, 5 pages.

Huawei, HiSilicon, "PUSCH enhancements for URLLC" , 3GPP TSG RAN WG1 #94bis R1-1811468 , Oct. 8-12, 2018 , Chengdu, China.

NTT Docomo, Inc. , "Enhancements for URLLC PUSCH", 3GPP TSG RAN WG1 #95 R1-1813326 , Nov. 12-16, 2018, Spokane, USA.

ZTE , "Enhancement for UL grant-free transmissions", 3GPP TSG RAN WG1 #95 R1-1813884 , Nov. 12-16, 2018 , Spokane, USA.

* cited by examiner

Single segment PUSCH 2 segments PUSCH

COMMUNICATIONS DEVICES, INFRASTRUCTURE EQUIPMENT AND METHODS

CROSS-REFERENCE TO RELATED APPLICATIONS

The present application is based on PCT filing PCT/EP2020/050573, filed Jan. 10, 2020, which claims priority to EP 19151270.6, filed Jan. 10, 2019, the entire contents of each are incorporated herein by reference.

BACKGROUND

Field of Disclosure

The present disclosure relates generally to communications devices, infrastructure equipment and methods of operating communications devices and infrastructure equipment and specifically to communications devices configured to transmit signals in accordance with Ultra Reliable Low Latency Communications (URLLC) requirements.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

One example of a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a communications device configured to transmit data to an infrastructure equipment of a wireless communications network. The communications device comprises transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface. In at least some embodiments, at least one of the first segment and the second segment comprises enough of the plurality of encoded bits such that the at least one of the first segment and the second segment can be independently decoded by the infrastructure equipment to recover the uplink data. In at least some embodiments, each of the first segment and the second segment comprises at least one demodulation reference signal, DMRS, associated with the each of the first segment and the second segment. In at least some embodiments, the first segment comprises a first code block group and the second segment comprises a second code block group, each of the first code block group and the second code block group comprising one or more code blocks each comprising a cyclic redundancy check, CRC. In at least some embodiments, the portion of the PUSCH in the first segment and the portion of the PUSCH in the second segment are formed by the communications device using a same rate matching.

Embodiments of the present technique, which further relate to infrastructure equipment, methods of operating communications devices and infrastructure equipment, and circuitry for communications devices and infrastructure equipment, allow for the transmission of a PUSCH in two segments over two slots of a radio frame using novel and efficient techniques.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
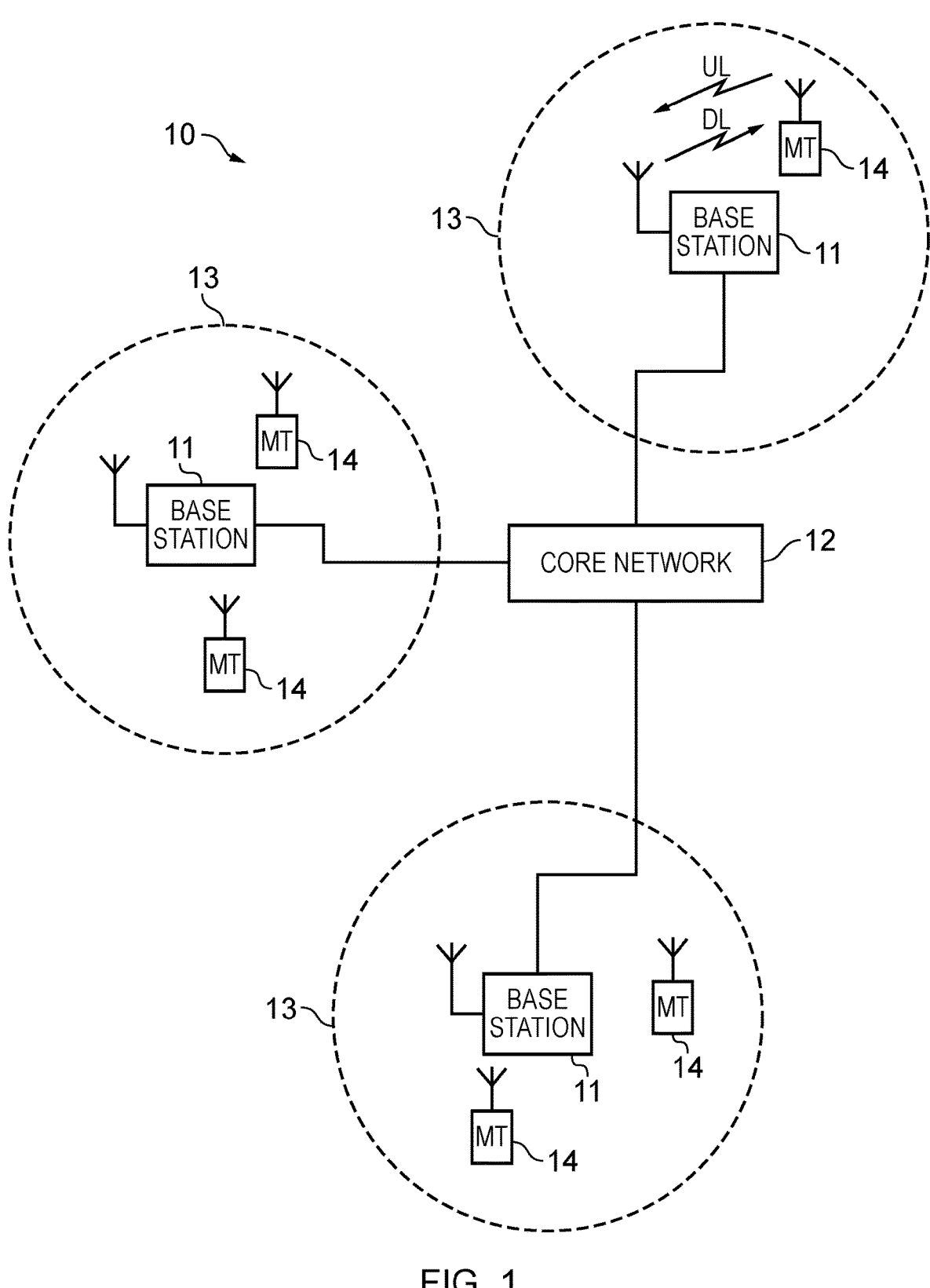
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)

Massive Machine Type Communications (mMTC)

Ultra Reliable & Low Latency Communications (URLLC) [2] eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms [3].

The elements of the wireless access network shown in FIG. 1 may be equally applied to a 5G new RAT configuration, except that a change in terminology may be applied as mentioned above.

Figure 2:
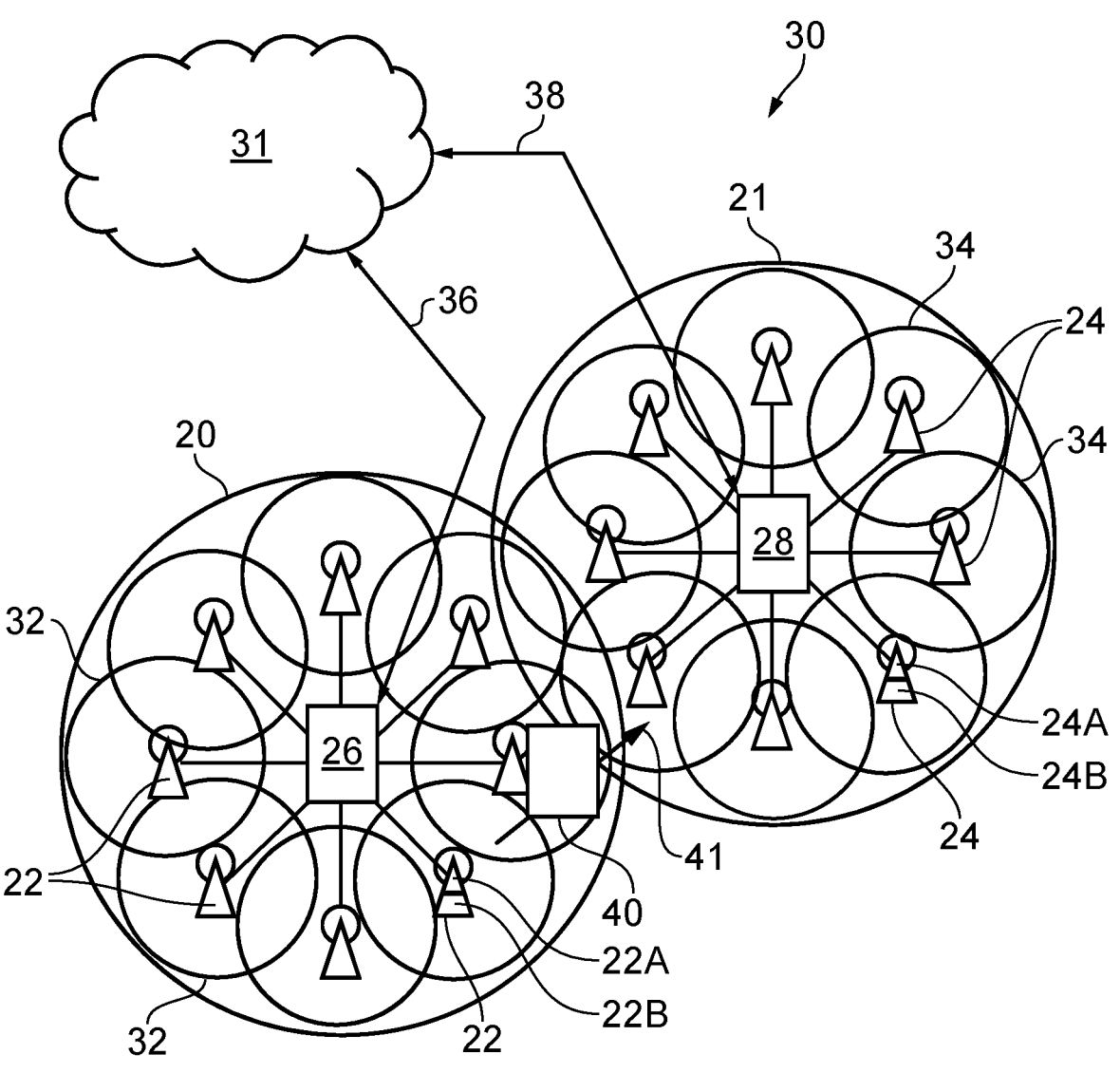
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/ remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/ TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Ultra Reliable & Low Latency Communications (URLLC)

Various techniques have been proposed in order to achieve the low latency and high reliability targets. Low latency can be achieved through one or more of the following techniques (which can be applied in combination):

Short scheduling interval. Transmissions can be scheduled at frequent intervals. The scheduling interval may be less than the duration of a slot in the frame (e.g. when the slot duration is 1 ms, it may be possible to schedule URLLC every 0.1 ms, i.e. with a scheduling interval of 0.1 ms).

Short TTI. The transmission time interval (TTI) of a URLLC transmission may consist of a small number of Orthogonal Frequency-Division Multiplexed (OFDM) symbols (i.e. much smaller than the duration of a slot).

On the fly decoding format. The format of the URLLC transmission may be designed to allow for "on the fly decoding". For example, reference symbols for channel estimation purposes may be located in the first OFDM symbol of the URLLC transmission and each OFDM symbol within the URLLC transmission can be decoded independently of other OFDM symbols (e.g. one OFDM symbol contains a whole forward error correction (FEC) codeword).

The short TTI referred to above can be termed a "mini-slot". The scheduling interval may also have an extent of a mini-slot.

High reliability can be achieved through one or more of the following techniques (which can be applied in combination):

Frequency diverse transmissions: Transmission of the URLLC information over a wide bandwidth makes those transmissions resilient to frequency selective fading.

Antenna diversity: Antenna diversity makes the URLLC transmission resilient to frequency selective fading on some of the channels between transmit and receive antennas.

Robust coding and modulation: Use of powerful forward error correction codes and robust modulation formats increases the resilience of the URLLC transmission to noise.

Hybrid ARQ: The URLLC transmission is protected with a cyclic redundancy check (CRC). If the CRC indicates that the URLLC packet is incorrect, the receiver can inform the transmitter of the error and the packet can be re-transmitted.

Repetition: The URLLC transmission can be repeated, such that if an initial reception of the packet fails, a second reception of the packet can be combined with the first reception of the packet to increase the effective signal to noise ratio (SNR) of the received packet and allow decoding of the packet.

URLLC is further studied in a Rel-16 Study Item (SI) [4], where a lower latency of up to 0.5 ms and a higher reliability of 99.9999% were required. The Physical Uplink Shared Channel (PUSCH) is one of the layer 1 channels identified in this SI for possible enhancements.

The length of the PUSCH can be 1 to 14 symbols long, where a short PUSCH transmission, e.g. 2 OFDM symbols in length, can be used for low latency transmission such as for URLLC. In 3GPP, a "mini-slot" is a non formal description of a time unit occupying 2 OFDM symbols. Since there are 14 OFDM symbols in a slot, a "mini-slot" is also non-formally, referred to as a "sub-slot." Although the URLLC PUSCH can occupy any number of OFDM symbols up to 14 OFDM symbols, a PUSCH transmission occupying a mini-slot is often used to represent (non-formally) a URLLC PUSCH transmission.

Figure 3:
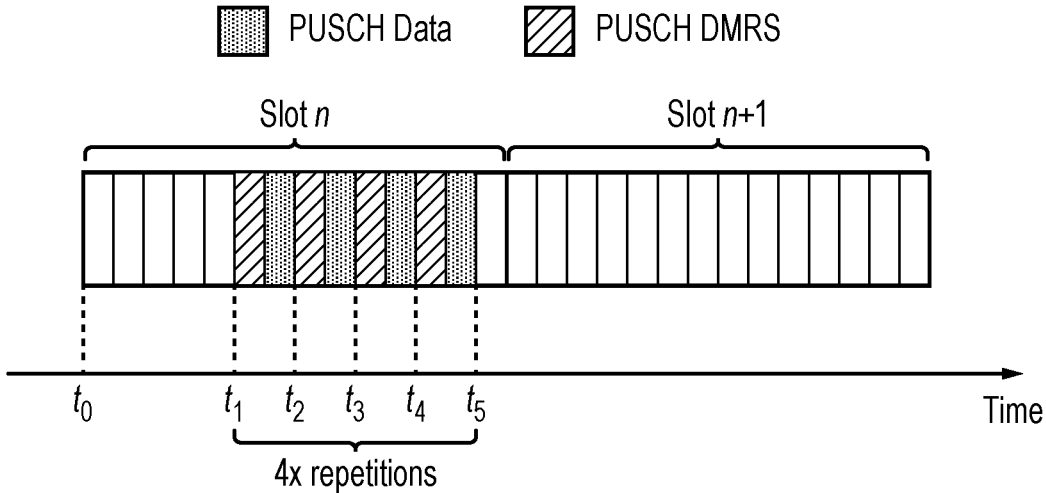
FIG. 3 shows a first example of mini-slot physical uplink shared channel (PUSCH) repetitions.

In Rd-15 NR, PUSCH slot aggregation is introduced where a PUSCH Transport Block (TB) is repeated over multiple slots (up to 8 slots) to improve the reliability of the transmission. Hence, one proposed method to improve the reliability of URLLC PUSCH is to perform repetitions at the mini-slot level (or symbols level). An example is shown in FIG. 3, in which a mini-slot PUSCH is repeated 4 times starting at time $t_1$, which is the $6^{th}$ symbol of Slot n. In Rd-15, a PUSCH transmission typically starts with a symbol of a demodulation reference signal (DMRS) followed by the data. It is argued that mini-slot repetitions resulted in excessive DMRS overhead, where a mini-slot PUSCH repetition as shown in the example in FIG. 3 has a DMRS overhead of 50%.

Figure 4:
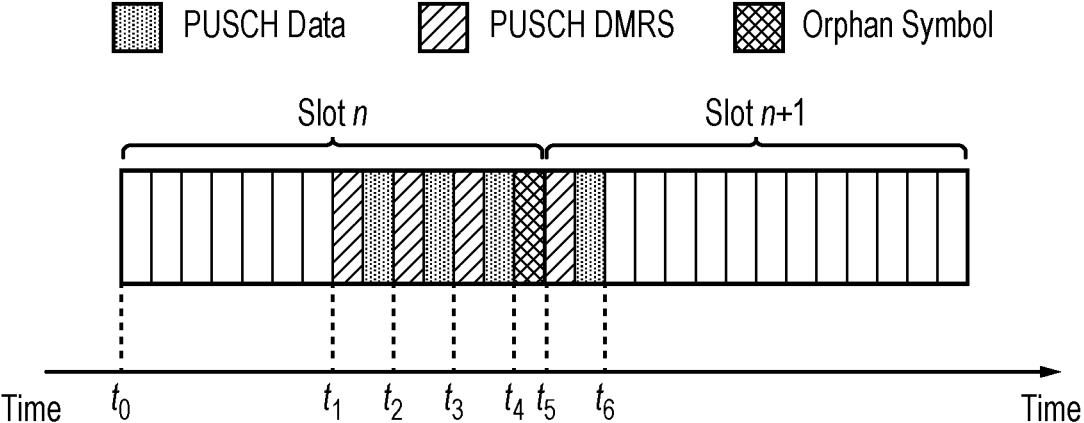
FIG. 4 shows a second example of mini-slot PUSCH repetitions, where the mini-slot PUSCH repetitions extend beyond the slot boundary.

Since URLLC requires low latency, a PUSCH mini-slot repetition can start near the end of a slot and there may not be sufficient symbols in the slot to complete the repetitions. Hence, it is proposed that a PUSCH repetition can cross slot boundary as shown in an example in FIG. 4. Here a 4×PUSCH mini-slot repetition starts at time $t_1$, which is the $8^{th}$ symbol of Slot n thereby leaving only 7 symbols for PUSCH repetitions. Hence, the repetitions occupies two slots, where 3 PUSCH repetitions are in Slot n and the last PUSCH repetition is in Slot n+1. There are several issues which may arise should a single TB cross the slot boundary, typically with respect to the physical layer (as logically such a TB should not pose problems). Each slot may have its own scrambling sequence, and other rules and regulations may vary with respect to those of other slots. Accordingly, it has also been agreed in 3GPP that a single PUSCH TB cannot cross slot boundary, and hence, the last PUSCH repetition in the example in FIG. 4 starts at the beginning of Slot n+1 at time $t_5$ rather than the last symbol of Slot n at time $t_4$. This leads to an "orphan symbol", i.e. the last symbol between time $t_4$ and $t_5$ of Slot n in FIG. 4, i.e. symbols toward the end of a slot that cannot contain an entire PUSCH. Orphan symbols are generally undesirable, as they lead to fragmentation of resources and a slight delay in the completion of the PUSCH repetitions.

Figure 5:
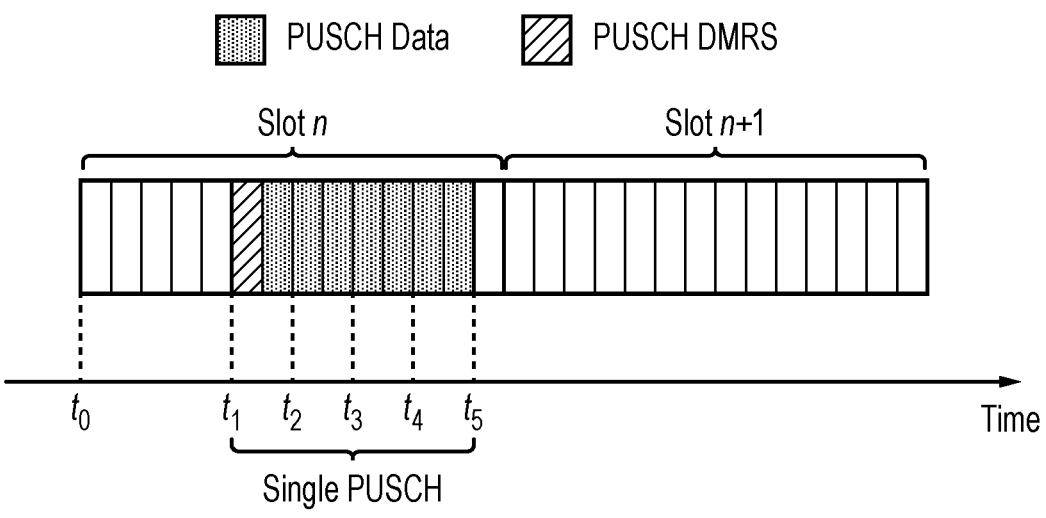
FIG. 5 shows a first example of a single transport block (TB) PUSCH transmission.

Recognising the drawbacks of mini-slot repetitions, i.e., high DMRS overhead and orphan symbols, it is proposed to transmit a single PUSCH occupying the same duration as that used for mini-slot repetition. For example instead of performing 4×PUSCH mini-slot repetition as in the example in FIG. 3 occupying 8 symbols, a single PUSCH Transport Block (TB) transmission with a duration of 8 symbols is used, as shown in FIG. 5. Here, the single PUSCH TB can have a very low coding rate, thereby offering the same (or higher) reliability as that of a 4×PUSCH repetition. It should be noted that such a transmission is already supported in Rel-15, which is known as PUSCH mapping Type B, i.e. the PUSCH transmission can start at any symbol within a slot and can have a duration of between 1 to 14 symbols, in contrast to mapping Type A where the PUSCH transmission starts at the first symbol of a slot. Such a transmission would not lead to a high DMRS overhead and, since the duration is flexible, it would avoid orphan symbols.

Figure 6:
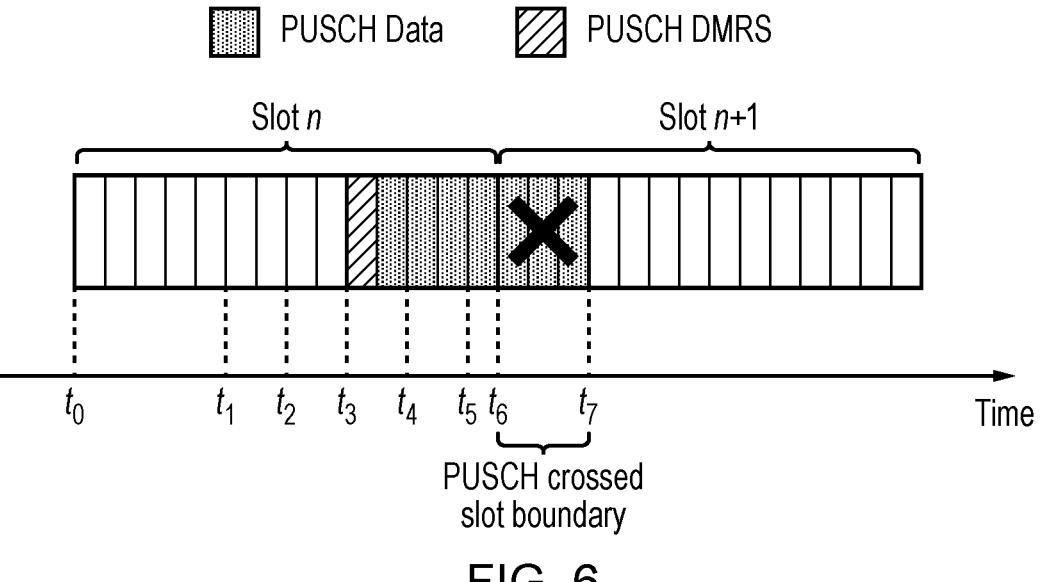
FIG. 6 shows a second example of a single TB PUSCH transmission, where Type B mapping is used and the TB extends beyond the slot boundary.

As noted previously, it was agreed in 3GPP that a single PUSCH TB cannot cross the slot boundary. Therefore, if the PUSCH mapping Type B transmission is used, the slot may not have sufficient symbols to fulfil the required reliability if the transmission starts towards the end of the slot. An example is shown in FIG. 6, where an 8 symbols PUSCH is required to meet the URLLC reliability but the transmission starts at time $t_3$ (i.e. the $10^{th}$ symbol of Slot n) which does not leave sufficient symbols within Slot n for the entire PUSCH transmission. Since a single PUSCH TB cannot cross slot boundary, only the first 5 symbols of the PUSCH can be transmitted as the last 3 symbols, if transmitted, would lead to the PUSCH TB crossing slot boundary. In other words, a gNodeB cannot schedule (or a UE cannot transmit) a PUSCH of more than five symbols for the transmission stating at time $t_3$. Delaying the transmission such that it starts at Slot n+1 would not be suitable for low latency URLLC services. Hence, such a transmission may not meet the reliability and latency requirement of URLLC.

Figure 7:
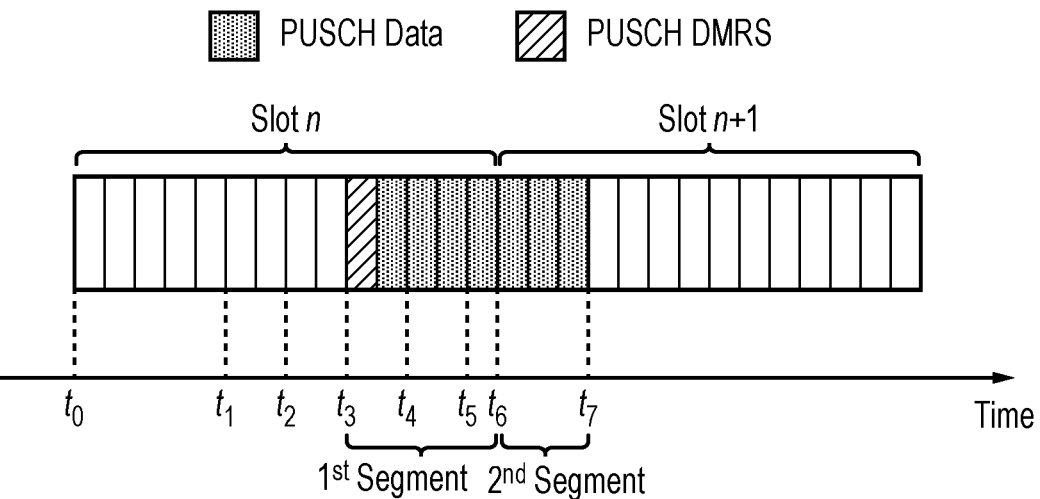
FIG. 7 shows a first example of a PUSCH transmission split into two segments.

Recognising the drawbacks of using PUSCH mapping Type B at the slot boundary, it is proposed in [5] that the PUSCH transmission is segmented into two portions where a first portion is in a slot and another portion is in another slot. Using the same example as in FIG. 6, the 8 symbol long PUSCH transmission starting at time $t_3$ would now be divided into two segments as shown in FIG. 7. Here the $1^{st}$ segment is 5 symbols long and resides in Slot n whilst the $2^{nd}$ segment is 3 symbols long and resides in Slot n+1. Here, each segment is a separate TB, which is described as unequal repetition.

Figure 8:
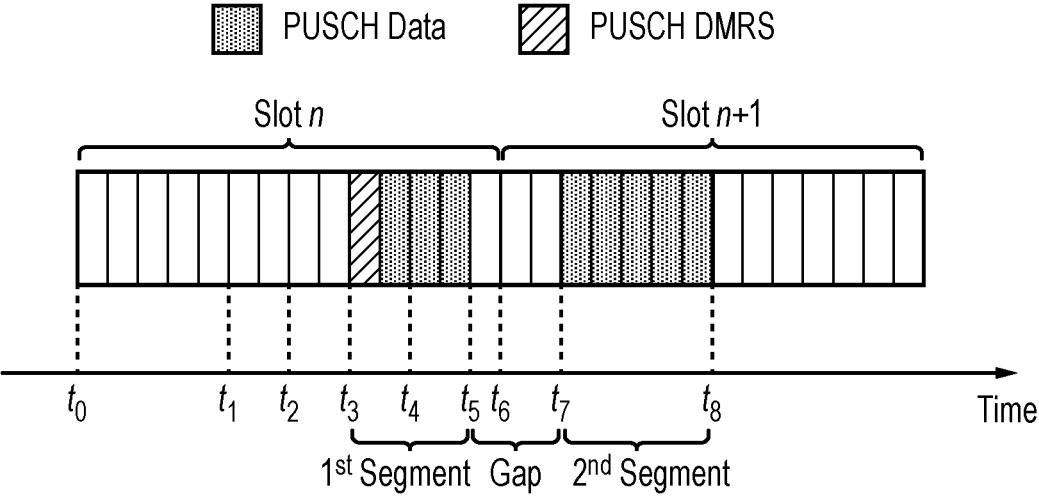
FIG. 8 shows a second example of a PUSCH transmission split into two segments with a gap between the two segments.

It should be noted that these 2 segments need not be contiguous in time, that is, there can be a gap between the $1^{st}$ and $2^{nd}$ segments. In a TDD operation, there can be downlink symbols between the $1^{st}$ segment and the $2^{nd}$ segment and hence resulting in such a gap. An example is shown in FIG. 8, where the $1^{st}$ segment is between time $t_3$ and $t_5$ in Slot n and the $2^{nd}$ segment starts at time $t_7$ in Slot n+1, leaving a gap between time $t_5$ and $t_7$ of 3 OFDM symbols.

Despite the above described proposal of [5] that the PUSCH transmission can be segmented into two portions in order to cross the slot boundary, the characteristics of 2 segment PUSCH transmission are not yet well defined. Embodiments of the present disclosure seek to provide further details on the segment PUSCH transmissions at the slot boundary.

Two-Segment PUSCH Repetitions Across the Slot Boundary

Figure 9:
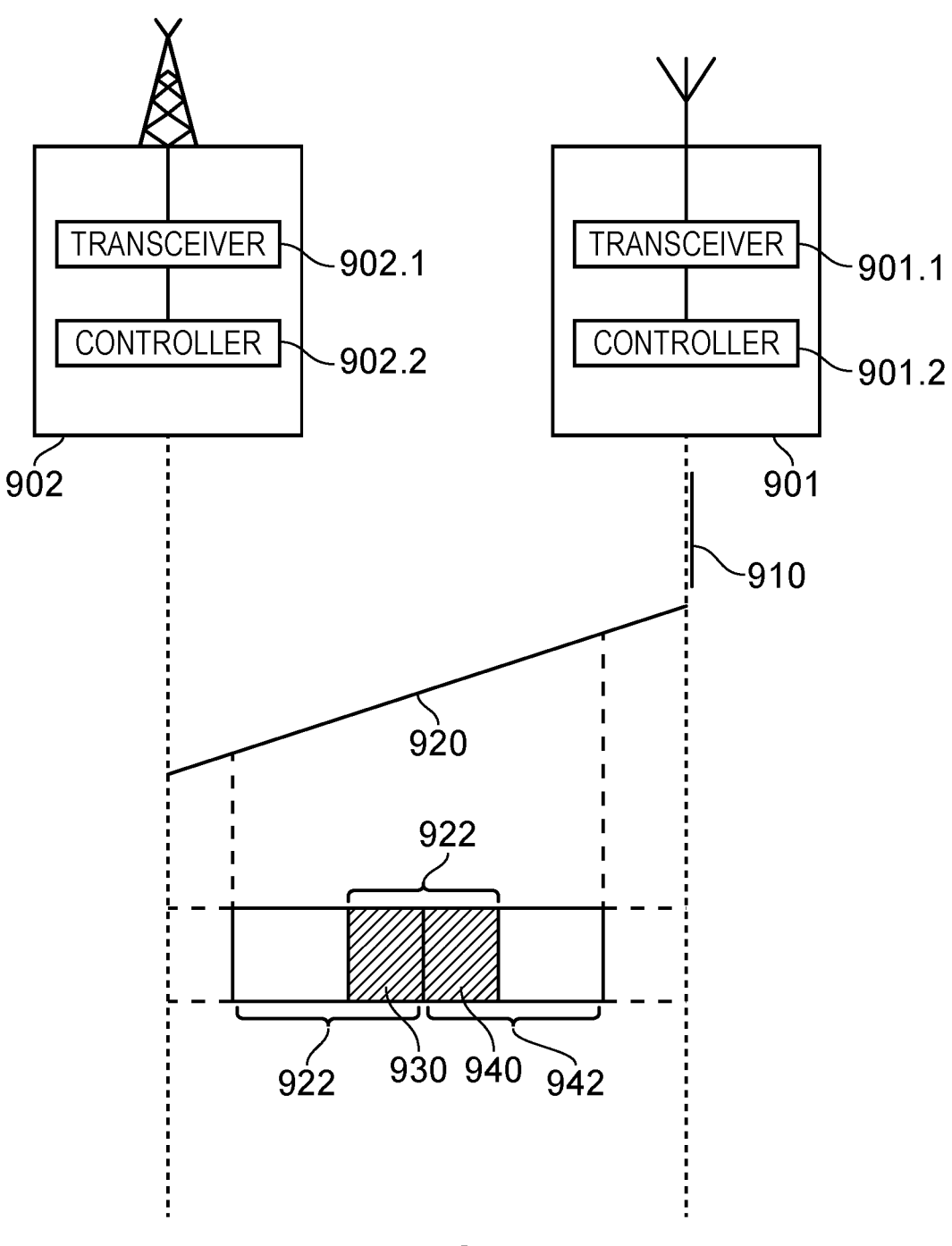
FIG. 9 shows a part schematic, part message flow diagram representation of a wireless communications network comprising a communications device and an infrastructure equipment in accordance with embodiments of the present technique.

FIG. 9 shows a part schematic, part message flow diagram representation of a wireless communications network comprising a communications device 901 and an infrastructure equipment 902 in accordance with embodiments of the present technique. The communications device 901 and the infrastructure equipment 902 each comprise a transceiver (or transceiver circuitry) 901.1, 902.1, and a controller (or controller circuitry) 901.2, 902.2. Each of the controllers 901.2, 902.2 may be, for example, a microprocessor, a CPU, or a dedicated chipset, etc.

The transceiver circuitry 901.1 and the controller circuitry 901.2 of the communications device 901 are configured in combination to generate 910 a plurality of encoded bits by encoding uplink data, to transmit 920, to the infrastructure equipment 902, the plurality of encoded bits in a plurality of Orthogonal Frequency-Division Multiplexed, OFDM, symbols in radio resources forming a physical uplink shared channel, PUSCH 922, of the wireless access interface, the PUSCH being divided between a first segment 930 located in a first time divided slot 932 of the wireless access interface and a second segment 940 located in a second time divided slot 942 of the wireless access interface.

In at least some embodiments, described in further detail below, at least one of the first segment 930 and the second segment 940 comprises enough (or all) of the plurality of encoded bits such that the at least one of the first segment 930 and the second segment 940 can be independently decoded by the infrastructure equipment 902 to recover the uplink data. In at least some embodiments, described in further detail below, each of the first segment 930 and the second segment 940 comprises at least one demodulation reference signal, DMRS, associated with the each of the first segment 930 and the second segment 940. In at least some embodiments, described in further detail below, the first segment 930 comprises a first code block group and the second segment 940 comprises a second code block group, each of the first code block group and the second code block group comprising one or more code blocks each comprising a cyclic redundancy check, CRC. In at least some embodiments, described in further detail below, the portion of the PUSCH 922 in the first segment 930 and the portion of the PUSCH 922 in the second segment 940 are formed by the communications device 901 using a same rate matching.

Self-Decodable Segments

In some embodiments of the present technique, for the 2 segment PUSCH transmission, at least one of the segments can be decoded independently of the other segment. That is, the gNodeB is able to retrieve the PUSCH data by decoding the said independently decodable segment of the PUSCH without the need of the other segment under good radio condition. In other words, as described above, at least one of the first segment and the second segment comprises enough (or all) of the plurality of encoded bits such that the at least one of the first segment and the second segment can be independently decoded by the infrastructure equipment to recover the uplink data. The other segment would provide redundancies to aid the gNodeB decoding of the independent segment, which is useful under poor radio condition. Although the independent segment can be the $1^{st}$ or the $2^{nd}$ segment, for cases where the independent segment is the $1^{st}$ segment then this would also enable the gNodeB to early terminate its decoding process without having to receive the $2^{nd}$ segment in which case the gNodeB can send an early acknowledgement to the UE so that the UE does not need to waste power to transmit the $2^{nd}$ segment. However, it should be appreciated by those skilled in the art that such embodiments allow for either or both segments to be independently decodable.

Figure 10:
FIG. 10 shows a first example of how a second segment of a PUSCH transmission can be formed as a subset of a first segment of the PUSCH transmission in accordance with embodiments of the present technique.
Figure 10:
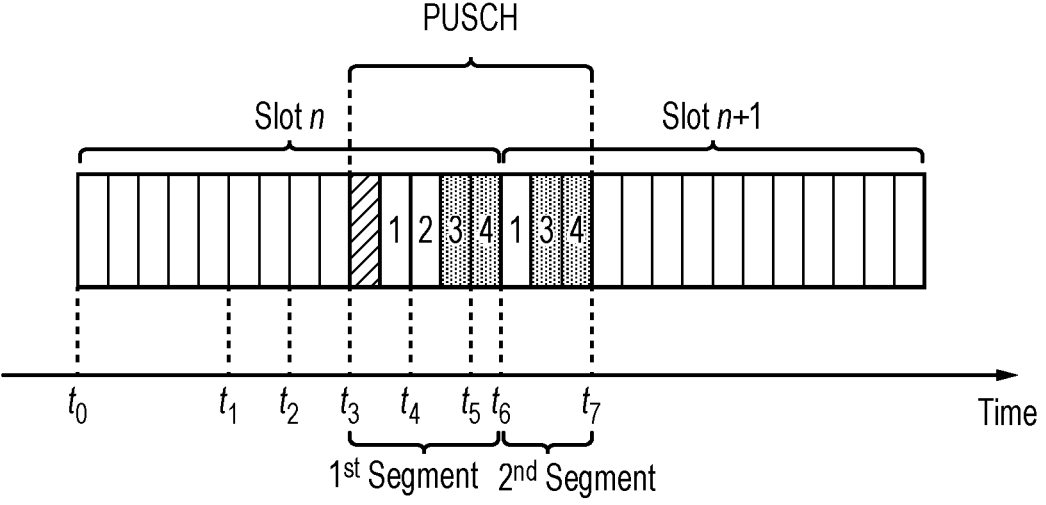
Figure 11:
FIG. 11 shows a second example of how a second segment of a PUSCH transmission can be formed as a subset of a first segment of the PUSCH transmission in accordance with embodiments of the present technique.
Figure 11:
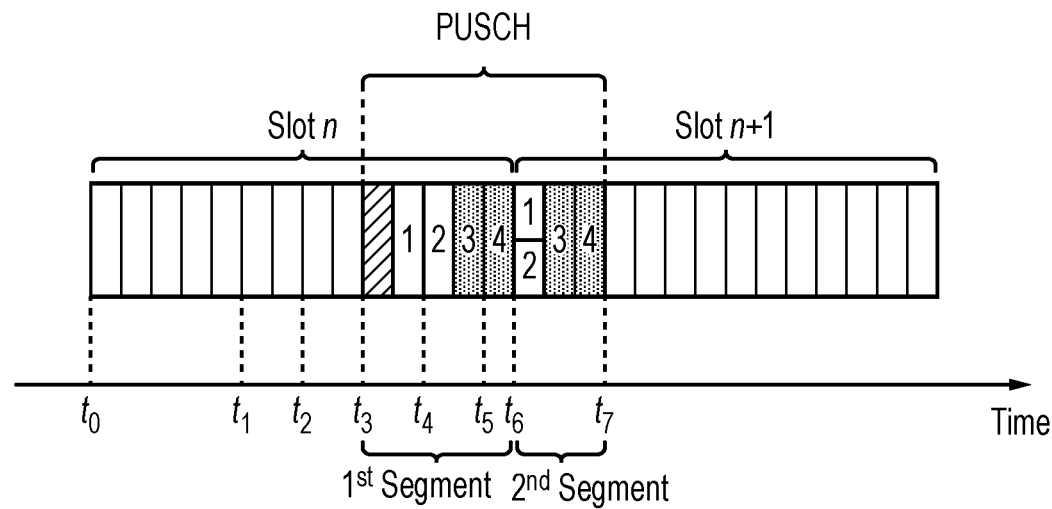

In an arrangement of such embodiments of the present technique, one segment is formed by taking a subset of another segment. In other words, one of the first segment and the second segment is formed by the communications device based on at least a subset of the OFDM symbols transmitted in the portion of the PUSCH of the other of the first segment and the second segment. This is explained in an example shown in FIG. 10, where an 8 OFDM symbol PUSCH transmission at time $t_3$ is segmented into 2 segments. The $1^{st}$ segment is 5 OFDM symbols long and the $2^{nd}$ segment is 3 OFDM symbols long where the $2^{nd}$ segment is formed by taking the symbols labelled as "1", "3" and "4" from the $1^{st}$ segment. That is to say, the $2^{nd}$ segment is a subset of the $1^{st}$ segment where this subset is a copy of three of the OFDM symbols from the $1^{st}$ segment. It should be appreciated that although the subset is form by taking a whole OFDM symbol of the $1^{st}$ segment in this example, the subset can be form by taking any portion of the $1^{st}$ segment, for example it can consist of half of OFDM symbol "1", half of OFDM symbol "2", OFDM symbol "3" & OFDM symbol "4" as shown in FIG. 11. In other words, in one arrangement, the at least the subset of the OFDM symbols comprises less than the whole of at least one of the OFDM symbols of the at least the subset of the OFDM symbols. This arrangement enables the $2^{nd}$ segment to be constructed purely at the symbol level (rather than having to retrieve it from the encoded bits and then perform modulation to convert them into modulated symbols).

In another arrangement of such embodiments of the present technique, the $1^{st}$ segment and the $2^{nd}$ segment are the same or different HARQ Redundancy Versions (RV). In other words, the first segment has a first Hybrid Automatic Repeat Request, HARQ, Redundancy Version, RV, and the second segment has a second HARQ RV, where the first HARQ RV and the second HARQ RV may be the same or may be different. In an example, the HARQ RVs of the $1^{st}$ segment and the $2^{nd}$ segment can be explicitly configured or dynamically indicated in a DCI from {0, 0} (i.e. same HARQ RVs) and {0, 3} (i.e. different RVs). In another example, the HARQ RV of the $2^{nd}$ segment can be implicitly determined based on the HARQ RV of the $1^{st}$ segment. In other words, the controller is configured to determine one of the first HARQ RV and the second HARQ RV based on the other of the first HARQ RV and the second HARQ RV. In another example, if the HARQ RV of the $2^{nd}$ segment is not configured or indicated, UE can assume the same HARQ RV as the $1^{st}$ segment for the $2^{nd}$ segment. It should be noted that it is not necessary that the segments have the same duration in time for this arrangement.

In another arrangement of such embodiments of the present technique, a first bit in the $2^{nd}$ segment is the next bit of the end bit in the $1^{st}$ segment in a circular buffer. In other words, the communications device comprises a circular buffer, and wherein a first of the encoded bits transmitted in the portion of the PUSCH of the second segment is stored in the circular buffer as a next bit to a last of the encoded bits transmitted in the portion of the PUSCH of the first segment.

In another arrangement of such embodiments of the present technique, the 2 segments are repetition of each other. Here the segments have the same duration in time. This allows the gNodeB to perform symbol combining of these two segments. In other words, the second segment is a repetition of the first segment, and the first segment has a same time duration as the second segment.

Demodulation Reference Signals (DMRS)

Figure 12:
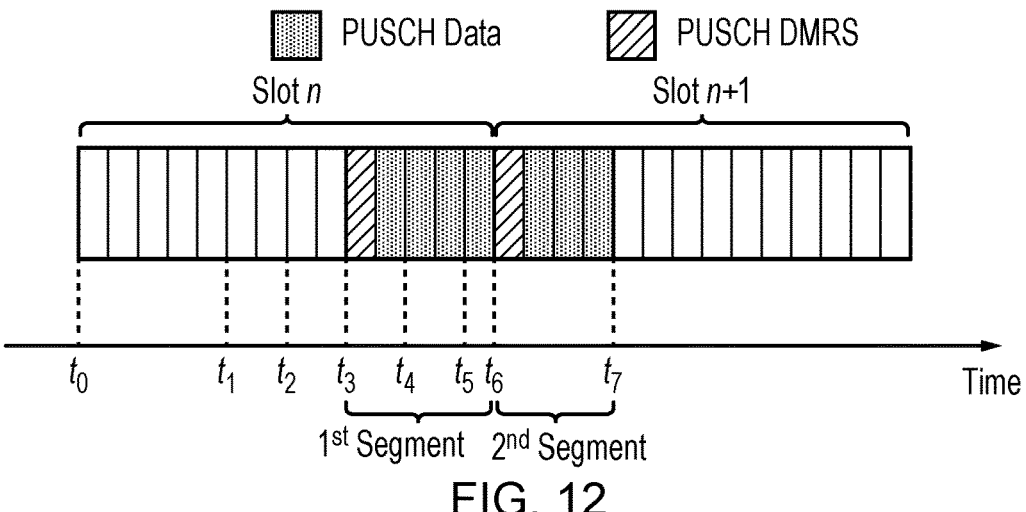
FIG. 12 shows an example of how DMRS can be included in each segment of a segmented PUSCH transmission in accordance with embodiments of the present technique.

In some embodiments of the present technique, each PUSCH segment contains its own DMRS. This enables different precoding to be used on each segment. Typically each slot would use different scrambling sequence to randomises interference and hence the DMRS in a previous slot may not be applicable in the current slot. In other words, as described above, each of the first segment and the second segment comprises at least one demodulation reference signal, DMRS, associated with the each of the first segment and the second segment. An example is shown in FIG. 12 where each segment consists of a front loaded DMRS, before the OFDM symbols which carry the uplink data.

In an arrangement of such embodiments of the present technique, at least one DMRS in each segment is transmitted at the beginning of the segment. That is, each segment has a front loaded DMRS as shown in FIG. 12. In other words, at least one of the at least one DMRS associated with the first segment is transmitted at the beginning of the first segment before the encoded bits, and at least one of the at least one DMRS associated with the second segment is transmitted at the beginning of the second segment before the encoded bits. It should be noted that a segment can have more than one OFDM symbol worth of DMRS.

In another arrangement of such embodiments of the present technique, frequency hopping is performed at the slot level such that the $1^{st}$ segment uses different frequency resources to those used by the $2^{nd}$ segment. In other words, frequency resources of the wireless access interface occupied by the first segment of the PUSCH are different to frequency resources of the wireless access interface occupied by the second segment of the PUSCH. Here, it is essential that each segment contains its own DMRS such that it can perform channel estimation using the DMRS that is relevant to the frequency resources used by each segment.

In another arrangement of such embodiments of the present technique, DMRS in each segment can be a different TCI (Transmission Configuration Indicator) state. In other words, each of the at least one DMRS of each of the first segment and the second segment is associated with a different one of a set of Transmission Configuration Indicator, TCI, states. Each TCI state contains parameters for configuring a quasi co-location relationship between one or two uplink reference signals and the DM-RS ports of the PUSCH. This can be suitable for multi-TRP (transmission and reception point) transmission.

Code Block Groups (CBGs)

In Rel-15 NR, a TB such as a PUSCH can be divided into multiple Code Blocks (CBs) where each CB contains its own CRC. A Code Block Group (CBG) is formed from at least one CB. This is beneficial because the receiver could indicate precisely which CBG contains errors and thus requires retransmission, thereby avoiding the transmitter (e.g. the UE) having to retransmit the entire TB. In other words, as described above, the first segment comprises a first code block group and the second segment comprises a second code block group, each of the first code block group and the second code block group comprising one or more code blocks each comprising a cyclic redundancy check, CRC.

In some arrangements of such embodiments of the present technique, for a PUSCH transmitted in a CBG manner, each segment does not contain partial CBG. That is, a CBG does not cross the slot boundary, such that one portion of a CBG is in one slot whilst the remaining portion of that CBG is in another slot. It should be noted that a CBG can contain one CB, and hence this arrangement also applies more generally to CBs as well as CBGs, that is, a CB cannot cross the slot boundary.

In an arrangement of such embodiments of the present technique, a segment itself is a CBG. In other words, the first segment is the first code block group, and wherein the second segment is the second code block group. Hence in this 2 PUSCH segment transmission, the $1^{st}$ segment is a $1^{st}$ CBG and the $2^{nd}$ segment is a $2^{nd}$ CBG. This allows the Rel-15 encoding to be used directly to produce the 2 PUSCH segment, thereby minimising specification changes (i.e. hardware and software changes at the UE and gNodeB). Since each CBG has its own CRC(s), this arrangement provides each segment its own CRC (or multiple CRCs for the case where a CBG contains multiple CBs).

Rate Matching

In some embodiments of the present technique, the PUSCH is formed using a single rate match, assuming that the PUSCH is not broken into 2 segments. In other words, as described above, the portion of the PUSCH in the first segment and the portion of the PUSCH in the second segment are formed by the communications device using a same rate matching. This maintains the legacy channel processing at the UE, or at least does not require two types of channel processing. The modulated symbols are then mapped to the Resource Elements (REs) of each segment. If DMRS is required in the $2^{nd}$ segment, the DMRS punctures the REs that are originally mapped to modulated symbols. This allows the UE to perform the encoding of the PUSCH channel and only decide whether to use single or 2 segment PUSCH at the RE mapping stage.

Signalling

The below described arrangements, relating to signalling aspects, are applicable to all of the above described embodiments, both when taken individually and when taken in combination.

In an arrangement, the UE is RRC configured by the network to transmit the PUSCH as 2 segments. In other words, the communications device is configured to receive Radio Resource Control, RRC, signalling from the infrastructure equipment, and to transmit the encoded bits to the infrastructure equipment in the PUSCH divided into the first segment and the second segment in response to receiving the RRC signalling from the infrastructure equipment.

In another arrangement, the gNodeB dynamically indicates in the DCI whether a 2 segment transmission is used on the PUSCH or not. In other words, the communications device is configured to receive Downlink Control Information, DCI, signalling from the infrastructure equipment, the DCI signalling indicating whether or not the PUSCH should be divided into the first segment and the second segment. This indication can be UE specific or group common, i.e. transmitted to multiple UEs by using group common PDCCH.

In another arrangement, each segment is independently scheduled by an UL grant. In other words, the communications device is configured to receive an indication of a first uplink grant and an indication of a second uplink grant from the infrastructure equipment, the first uplink grant scheduling the first segment of the PUSCH and the second uplink grant scheduling the second segment of the PUSCH. These UL grants can be:

Signalled separately using two DCIs, i.e. each segment is scheduled by a different DCI (in other words, the communications device is configured to receive the indication of the first uplink grant as part of first DCI signalling from the infrastructure equipment and the communications device is configured to receive the indication of the second uplink grant as part of second DCI signalling from the infrastructure equipment); or Jointly coded in a single DCI, i.e. the 2 segment PUSCH grants are jointly coded and signalled by a single DCI (in other words, the communications device is configured to receive the indication of the first uplink grant and the indication of the second uplink grant as part of single DCI signalling from the infrastructure equipment).

Figure 13A:
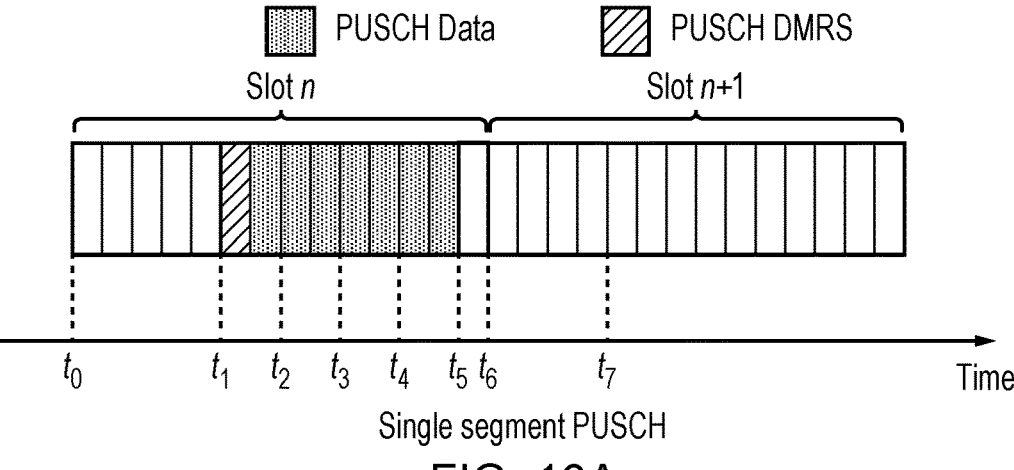
FIGS. 13A and 13B show an example of how a communications device is able to implicitly determine whether or not to transmit a PUSCH as a single segment or as two segments in accordance with embodiments of the present technique.
Figure 13B:
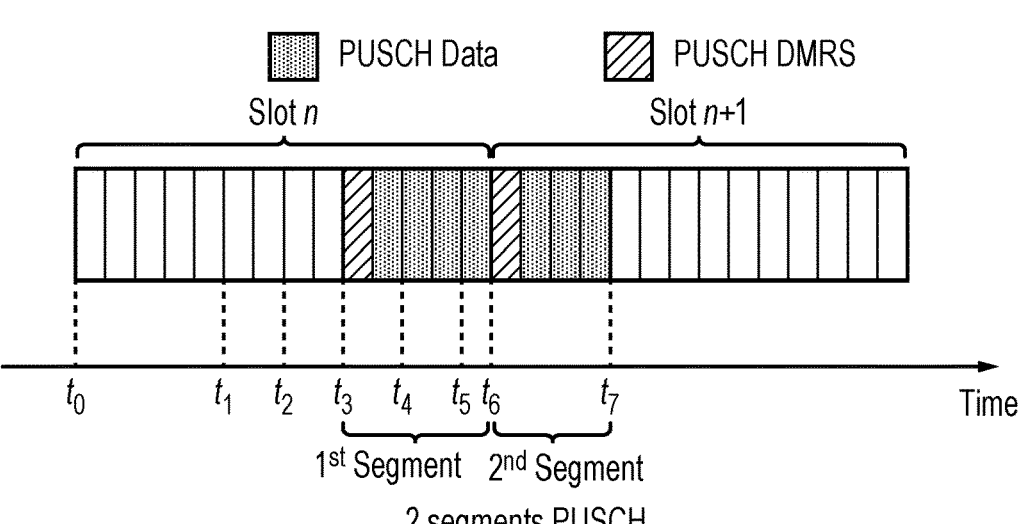

In another arrangement, the UE implicitly determines whether a 2 segment PUSCH transmission is used based on the starting symbols of the PUSCH in a slot, the duration of the PUSCH and the number of symbols available in that slot. In other words, the communications device is configured to determine indicating whether or not the PUSCH should be divided into the first segment and the second segment in accordance with at least one of a symbol of the first time divided slot which comprises the first OFDM symbol of the PUSCH, a time duration of the PUSCH, and a number of available symbols of the first time divided slot. An example is shown in FIG. 13, where an 8 OFDM symbol PUSCH is scheduled for a UE. In the scenario shown in FIG. 13A, this PUSCH is scheduled to transmit at time $t_1$ of Slot n. The UE determines that there are more than 8 OFDM symbols between time $t_1$ and the end of Slot n at time $t_6$ and hence the UE uses a single PUSCH transmission. In the scenario shown in FIG. 13B however, the 8 OFDM symbol PUSCH is scheduled to transmit at time $t_3$ and since there are only 5

OFDM symbols between time $t_3$ and the end of Slot n at time $t_6$, the UE determines that it cannot fully contain the PUSCH in Slot n and therefore uses a 2 segment PUSCH transmission. In this example, the UE extends the $2^{nd}$ segment by 1 OFDM symbol in order to include a front loaded DMRS in the $2^{nd}$ segment.

It should be appreciated by those skilled in the art that each of the above described embodiments can be combined in some implementations of embodiments of the present technique. For example the CBG aspects can be implemented with the Self-Decodable aspect and the DMRS aspect, i.e. each segment is a CBG where the CBG is sufficient to decode the PUSCH TB and each segment also contains its own DMRS.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The Following Numbered Paragraphs Provide Further Example Aspects and Features of the Present Technique:

Paragraph 1. A communications device configured to transmit data to an infrastructure equipment of a wireless communications network, the communications device comprising transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein at least one of the first segment and the second segment comprises enough of the plurality of encoded bits such that the at least one of the first segment and the second segment can be independently decoded by the infrastructure equipment to recover the uplink data.

Paragraph 2. A communications device according to Paragraph 1, wherein one of the first segment and the second segment is formed by the communications device based on at least a subset of the OFDM symbols transmitted in the portion of the PUSCH of the other of the first segment and the second segment.

Paragraph 3. A communications device according to Paragraph 2, wherein the at least the subset of the OFDM symbols comprises less than the whole of at least one of the OFDM symbols of the at least the subset of the OFDM symbols.

Paragraph 4. A communications device according to any of Paragraphs 1 to 3, wherein the first segment has a first Hybrid Automatic Repeat Request, HARQ, Redundancy Version, RV, and the second segment has a second HARQ RV.

Paragraph 5. A communications device according to Paragraph 4, wherein the first HARQ RV and the second HARQ RV are the same.

Paragraph 6. A communications device according to Paragraph 4 or Paragraph 5, wherein the first HARQ RV and the second HARQ RV are different.

Paragraph 7. A communications device according to any of Paragraphs 4 to 6, wherein the controller is configured to determine one of the first HARQ RV and the second HARQ RV based on the other of the first HARQ RV and the second HARQ RV.

Paragraph 8. A communications device according to any of Paragraphs 1 to 7, wherein the communications device comprises a circular buffer, and wherein a first of the encoded bits transmitted in the portion of the PUSCH of the second segment is stored in the circular buffer as a next bit to a last of the encoded bits transmitted in the portion of the PUSCH of the first segment.

Paragraph 9. A communications device according to any of Paragraphs 1 to 8, wherein the second segment is a repetition of the first segment, and the first segment has a same time duration as the second segment.

Paragraph 10. A communications device according to any of Paragraphs 1 to 9, wherein the communications device is configured to receive Radio Resource Control, RRC, signalling from the infrastructure equipment, and to transmit the encoded bits to the infrastructure equipment in the PUSCH divided into the first segment and the second segment in response to receiving the RRC signalling from the infrastructure equipment.

Paragraph 11. A communications device according to any of Paragraphs 1 to 10, wherein the communications device is configured to receive Downlink Control Information, DCI, signalling from the infrastructure equipment, the DCI signalling indicating whether or not the PUSCH should be divided into the first segment and the second segment.

Paragraph 12. A communications device according to any of Paragraphs 1 to 11, wherein the communications device is configured to receive an indication of a first uplink grant and an indication of a second uplink grant from the infrastructure equipment, the first uplink grant scheduling the first segment of the PUSCH and the second uplink grant scheduling the second segment of the PUSCH.

Paragraph 13. A communications device according to Paragraph 12, wherein the communications device is configured to receive the indication of the first uplink grant as part of first DCI signalling from the infrastructure equipment and the communications device is configured to receive the indication of the second uplink grant as part of second DCI signalling from the infrastructure equipment.

Paragraph 14. A communications device according to Paragraph 12 or Paragraph 13, wherein the communications device is configured to receive the indication of the first uplink grant and the indication of the second uplink grant as part of single DCI signalling from the infrastructure equipment.

Paragraph 15. A communications device according to any of Paragraphs 1 to 14, wherein the communications device is configured to determine indicating whether or not the PUSCH should be divided into the first segment and the second segment in accordance with at least one of a symbol of the first time divided slot which comprises the first OFDM symbol of the PUSCH, a time duration of the PUSCH, and a number of available symbols of the first time divided slot.

Paragraph 16. A method of operating a communications device configured to transmit data to an infrastructure equipment of a wireless communications network, the method comprising generating a plurality of encoded bits by encoding uplink data, transmitting, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein at least one of the first segment and the second segment comprises enough of the plurality of encoded bits such that the at least one of the first segment and the second segment can be independently decoded by the infrastructure equipment to recover the uplink data.

Paragraph 17. Circuitry for a communications device configured to transmit data to an infrastructure equipment of a wireless communications network, the communications device comprising transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein at least one of the first segment and the second segment comprises enough of the plurality of encoded bits such that the at least one of the first segment and the second segment can be independently decoded by the infrastructure equipment to recover the uplink data.

Paragraph 18. An infrastructure equipment of a wireless communications network configured to receive data from a communications device, the infrastructure equipment comprising transceiver circuitry configured to transmit signals and receive signals via a wireless access interface provided by the wireless communications network, and controller circuitry configured to control the transceiver circuitry to receive, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein at least one of the first segment and the second segment comprises enough of the plurality of encoded bits such that the at least one of the first segment and the second segment can be independently decoded by the infrastructure equipment to recover the uplink data.

Paragraph 19. A method of operating an infrastructure equipment of a wireless communications network configured to receive data from a communications device, the method comprising receiving, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein at least one of the first segment and the second segment comprises enough of the plurality of encoded bits such that the at least one of the first segment and the second segment can be independently decoded by the infrastructure equipment to recover the uplink data.

Paragraph 20. Circuitry for an infrastructure equipment of a wireless communications network configured to receive data from a communications device, the infrastructure equipment comprising transceiver circuitry configured to transmit signals and receive signals via a wireless access interface provided by the wireless communications network, and controller circuitry configured to control the transceiver circuitry to receive, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein at least one of the first segment and the second segment comprises enough of the plurality of encoded bits such that the at least one of the first segment and the second segment can be independently decoded by the infrastructure equipment to recover the uplink data.

Paragraph 21. A communications device configured to transmit data to an infrastructure equipment of a wireless communications network, the communications device comprising transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein each of the first segment and the second segment comprises at least one demodulation reference signal, DMRS, associated with the each of the first segment and the second segment.

Paragraph 22. A communications device according to any of Paragraphs 1 to 15, wherein each of the first segment and the second segment comprises at least one demodulation reference signal, DMRS, associated with the each of the first segment and the second segment.

Paragraph 23. A communications device according to Paragraph 21 or Paragraph 22, wherein at least one of the at least one DMRS associated with the first segment is transmitted at the beginning of the first segment before the encoded bits, and at least one of the at least one DMRS associated with the second segment is transmitted at the beginning of the second segment before the encoded bits.

Paragraph 24. A communications device according to any of Paragraphs 21 to 23, wherein frequency resources of the wireless access interface occupied by the first segment of the PUSCH are different to frequency resources of the wireless access interface occupied by the second segment of the PUSCH.

Paragraph 25. A communications device according to any of Paragraphs 21 to 24, wherein each of the at least one DMRS of each of the first segment and the second segment is a different one of a set of Transmission Configuration Indicator, TCI, states.

Paragraph 26. A method of operating a communications device configured to transmit data to an infrastructure equipment of a wireless communications network, the method comprising generating a plurality of encoded bits by encoding uplink data, transmitting, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein each of the first segment and the second segment comprises at least one demodulation reference signal, DMRS, associated with the each of the first segment and the second segment.

Paragraph 27. Circuitry for a communications device configured to transmit data to an infrastructure equipment of a wireless communications network, the communications device comprising transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein each of the first segment and the second segment comprises at least one demodulation reference signal, DMRS, associated with the each of the first segment and the second segment.

Paragraph 28. An infrastructure equipment of a wireless communications network configured to receive data from a communications device, the infrastructure equipment comprising transceiver circuitry configured to transmit signals and receive signals via a wireless access interface provided by the wireless communications network, and controller circuitry configured to control the transceiver circuitry to receive, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein each of the first segment and the second segment comprises at least one demodulation reference signal, DMRS, associated with the each of the first segment and the second segment.

Paragraph 29. A method of operating an infrastructure equipment of a wireless communications network configured to receive data from a communications device, the method comprising receiving, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein each of the first segment and the second segment comprises at least one demodulation reference signal, DMRS, associated with the each of the first segment and the second segment.

Paragraph 30. Circuitry for an infrastructure equipment of a wireless communications network configured to receive data from a communications device, the infrastructure equipment comprising transceiver circuitry configured to transmit signals and receive signals via a wireless access interface provided by the wireless communications network, and controller circuitry configured to control the transceiver circuitry to receive, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein each of the first segment and the second segment comprises at least one demodulation reference signal, DMRS, associated with the each of the first segment and the second segment.

Paragraph 31. A communications device configured to transmit data to an infrastructure equipment of a wireless communications network, the communications device comprising transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the first segment comprises a first code block group and the second segment comprises a second code block group, each of the first code block group and the second code block group comprising one or more code blocks each comprising a cyclic redundancy check, CRC.

Paragraph 32. A communications device according to any of Paragraphs 1 to 15 or 21 to 25, wherein the first segment comprises a first code block group and the second segment comprises a second code block group, each of the first code block group and the second code block group comprising one or more code blocks each comprising a cyclic redundancy check, CRC.

Paragraph 33. A communications device according to Paragraph 31 or Paragraph 32, wherein the first segment is the first code block group, and wherein the second segment is the second code block group.

Paragraph 34. A method of operating a communications device configured to transmit data to an infrastructure equipment of a wireless communications network, the method comprising generating a plurality of encoded bits by encoding uplink data, transmitting, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the first segment comprises a first code block group and the second segment comprises a second code block group, each of the first code block group and the second code block group comprising one or more code blocks each comprising a cyclic redundancy check, CRC.

Paragraph 35. Circuitry for a communications device configured to transmit data to an infrastructure equipment of a wireless communications network, the communications device comprising transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the first segment comprises a first code block group and the second segment comprises a second code block group, each of the first code block group and the second code block group comprising one or more code blocks each comprising a cyclic redundancy check, CRC.

Paragraph 36. An infrastructure equipment of a wireless communications network configured to receive data from a communications device, the infrastructure equipment comprising transceiver circuitry configured to transmit signals and receive signals via a wireless access interface provided by the wireless communications network, and controller circuitry configured to control the transceiver circuitry to receive, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the first segment comprises a first code block group and the second segment comprises a second code block group, each of the first code block group and the second code block group comprising one or more code blocks each comprising a cyclic redundancy check, CRC.

Paragraph 37. A method of operating an infrastructure equipment of a wireless communications network configured to receive data from a communications device, the method comprising receiving, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the first segment comprises a first code block group and the second segment comprises a second code block group, each of the first code block group and the second code block group comprising one or more code blocks each comprising a cyclic redundancy check, CRC.

Paragraph 38. Circuitry for an infrastructure equipment of a wireless communications network configured to receive data from a communications device, the infrastructure equipment comprising transceiver circuitry configured to transmit signals and receive signals via a wireless access interface provided by the wireless communications network, and controller circuitry configured to control the transceiver circuitry to receive, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the first segment comprises a first code block group and the second segment comprises a second code block group, each of the first code block group and the second code block group comprising one or more code blocks each comprising a cyclic redundancy check, CRC.

Paragraph 39. A communications device configured to transmit data to an infrastructure equipment of a wireless communications network, the communications device comprising transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the portion of the PUSCH in the first segment and the portion of the PUSCH in the second segment are formed by the communications device using a same rate matching.

Paragraph 40. A communications device according to any of Paragraphs 1 to 15, 21 to 25, or 31 to 33, wherein the portion of the PUSCH in the first segment and the portion of the PUSCH in the second segment are formed by the communications device using a same rate matching.

Paragraph 41. A method of operating a communications device configured to transmit data to an infrastructure equipment of a wireless communications network, the method comprising generating a plurality of encoded bits by encoding uplink data, transmitting, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the portion of the PUSCH in the first segment and the portion of the PUSCH in the second segment are formed by the communications device using a same rate matching.

Paragraph 42. Circuitry for a communications device configured to transmit data to an infrastructure equipment of a wireless communications network, the communications device comprising transceiver circuitry configured to transmit signals and receive signals via a wireless access interface provided by the wireless communications network, and controller circuitry configured to control the transceiver circuitry to generate a plurality of encoded bits by encoding uplink data, to transmit, to the infrastructure equipment, the plurality of encoded bits in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the portion of the PUSCH in the first segment and the portion of the PUSCH in the second segment are formed by the communications device using a same rate matching.

Paragraph 43. An infrastructure equipment of a wireless communications network configured to receive data from a communications device, the infrastructure equipment comprising transceiver circuitry configured to transmit signals and receive signals via a wireless access interface provided by the wireless communications network, and controller circuitry configured to control the transceiver circuitry to receive, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the portion of the PUSCH in the first segment and the portion of the PUSCH in the second segment are formed by the communications device using a same rate matching.

Paragraph 44. A method of operating an infrastructure equipment of a wireless communications network configured to receive data from a communications device, the method comprising receiving, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the portion of the PUSCH in the first segment and the portion of the PUSCH in the second segment are formed by the communications device using a same rate matching.

Paragraph 45. Circuitry for an infrastructure equipment of a wireless communications network configured to receive data from a communications device, the infrastructure equipment comprising transceiver circuitry configured to transmit signals and receive signals via a wireless access interface provided by the wireless communications network, and controller circuitry configured to control the transceiver circuitry to receive, from the communications device, a plurality of encoded bits, representing uplink data encoded by the communications device, in a plurality of Orthogonal Frequency-Division Multiplexed, OFDM, symbols in radio resources forming a physical uplink shared channel, PUSCH, of the wireless access interface, the PUSCH being divided between a first segment located in a first time divided slot of the wireless access interface and a second segment located in a second time divided slot of the wireless access interface, wherein the portion of the PUSCH in the first segment and the portion of the PUSCH in the second segment are formed by the communications device using a same rate matching.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Revised WID on New Radio Access Technology," NTT DOCOMO, RAN #78.
[3] TR 38.913, "Study on Scenarios and Requirements for Next Generation Access Technologies (Release 14)", 3rd Generation Partnership Project.
[4] RP-182089, "Study on physical layer enhancements for NR ultra-reliable and low latency communication (URLLC)," Huawei, HiSilicon, Nokia, Nokia Shanghai Bell, RAN #81.
[5] R1-1812155, "PUSCH Enhancements for NR URLLC," Ericsson, RAN1 #95.

What is claimed is:

1. A communications device configured to transmit data to an infrastructure equipment of a wireless communications network, the communications device comprising:
transceiver circuitry configured to transmit signals and receive signals via a wireless access interface provided by the wireless communications network, and
controller circuitry configured to control the transceiver circuitry:
to generate a plurality of encoded bits by encoding uplink data, and
to transmit, to the infrastructure equipment, the plurality of encoded bits in a plurality of Orthogonal Frequency-Division Multiplexed (OFDM) symbols in radio resources forming a physical uplink shared channel (PUSCH) of the wireless access interface, the PUSCH being divided between a first segment located in a first time divided slot of the wireless access interface and a second segment located in a second time divided slot of the wireless access interface,
wherein at least one of the first segment and the second segment comprises enough of the plurality of encoded bits such that the at least one of the first segment and the second segment can be independently decoded by the infrastructure equipment to recover the uplink data,
the second segment is a repetition of the first segment, and
the first segment has a same time duration as the second segment, and
a total number of OFDM symbols for the PUSCH is greater than a number of available OFDM symbols remaining in the first time divided slot from a starting symbol of the PUSCH in the first time divided slot.

2. The communications device according to claim 1, wherein one of the first segment and the second segment is formed by the communications device based on at least a subset of the OFDM symbols transmitted in the portion of the PUSCH of the other of the first segment and the second segment.

3. The communications device according to claim 2, wherein the at least the subset of the OFDM symbols comprises less than the whole of at least one of the OFDM symbols of the at least the subset of the OFDM symbols.

4. The communications device according to claim 1, wherein the first segment has a first Hybrid Automatic Repeat Request (HARQ) Redundancy Version (RV) and the second segment has a second HARQ RV.

5. The communications device according to claim 4, wherein the first HARQ RV and the second HARQ RV are the same.

6. The communications device according to claim 4, wherein the first HARQ RV and the second HARQ RV are different.

7. The communications device according to claim 4, wherein the controller circuitry is configured to determine one of the first HARQ RV and the second HARQ RV based on the other of the first HARQ RV and the second HARQ RV.

8. The communications device according to claim 1, wherein the communications device comprises a circular buffer, and wherein a first of the encoded bits transmitted in the portion of the PUSCH of the second segment is stored in the circular buffer as a next bit to a last of the encoded bits transmitted in the portion of the PUSCH of the first segment.

9. The communications device according to claim 1, wherein the communications device is configured:
to receive Radio Resource Control (RRC) signalling from the infrastructure equipment, and
to transmit the encoded bits to the infrastructure equipment in the PUSCH divided into the first segment and the second segment in response to receiving the RRC signalling from the infrastructure equipment.

10. The communications device according to claim 1, wherein the communications device is configured to receive Downlink Control Information (DCI) signalling from the infrastructure equipment, the DCI signalling indicating whether or not the PUSCH should be divided into the first segment and the second segment.

11. The communications device according to claim 1, wherein the communications device is configured to receive an indication of a first uplink grant and an indication of a second uplink grant from the infrastructure equipment, the first uplink grant scheduling the first segment of the PUSCH and the second uplink grant scheduling the second segment of the PUSCH.

12. The communications device according to claim 11, wherein the communications device is configured to receive the indication of the first uplink grant as part of first DCI signalling from the infrastructure equipment and the communications device is configured to receive the indication of the second uplink grant as part of second DCI signalling from the infrastructure equipment.

13. The communications device according to claim 11, wherein the communications device is configured to receive the indication of the first uplink grant and the indication of the second uplink grant as part of single DCI signalling from the infrastructure equipment.

14. The communications device according to claim 1, wherein the communications device is configured to determine indicating whether or not the PUSCH should be divided into the first segment and the second segment in accordance with at least one of a symbol of the first time divided slot which comprises the first OFDM symbol of the PUSCH, a time duration of the PUSCH, and a number of available symbols of the first time divided slot.

15. A communications device configured to transmit data to an infrastructure equipment of a wireless communications network, the communications device comprising:

transceiver circuitry configured to transmit signals and receive signals via a wireless access interface provided by the wireless communications network, and controller circuitry configured to control the transceiver circuitry:

to generate a plurality of encoded bits by encoding uplink data, and to transmit, to the infrastructure equipment, the plurality of encoded bits in a plurality of Orthogonal Frequency-Division Multiplexed (OFDM) symbols in radio resources forming a physical uplink shared channel (PUSCH) of the wireless access interface, the PUSCH being divided between a first segment located in a first time divided slot of the wireless access interface and a second segment located in a second time divided slot of the wireless access interface, wherein each of the first segment and the second segment comprises at least one demodulation reference signal (DMRS) associated with the each of the first segment and the second segment, the second segment is a repetition of the first segment, and the first segment has a same time duration as the second segment, and a total number of OFDM symbols for the PUSCH is greater than a number of available OFDM symbols remaining in the first time divided slot from a starting symbol of the PUSCH in the first time divided slot.

16. The communications device according to claim 15, wherein at least one of the at least one DMRS associated with the first segment is transmitted at the beginning of the first segment before the encoded bits, and at least one of the at least one DMRS associated with the second segment is transmitted at the beginning of the second segment before the encoded bits.

17. The communications device according to claim 15, wherein frequency resources of the wireless access interface occupied by the first segment of the PUSCH are different to frequency resources of the wireless access interface occupied by the second segment of the PUSCH.

18. The communications device according to claim 15, wherein each of the at least one DMRS of each of the first segment and the second segment is a different one of a set of Transmission Configuration Indicator (TCI) states.

19. A method of operating a communications device configured to transmit data to an infrastructure equipment of a wireless communications network, the method comprising:

generating a plurality of encoded bits by encoding uplink data, transmitting, to the infrastructure equipment, the plurality of encoded bits in a plurality of Orthogonal Frequency-Division Multiplexed (OFDM) symbols in radio resources forming a physical uplink shared channel (PUSCH) of the wireless access interface, the PUSCH being divided between a first segment located in a first time divided slot of the wireless access interface and a second segment located in a second time divided slot of the wireless access interface, wherein each of the first segment and the second segment comprises at least one demodulation reference signal (DMRS) associated with the each of the first segment and the second segment, the second segment is a repetition of the first segment, and the first segment has a same time duration as the second segment, and a total number of OFDM symbols for the PUSCH is greater than a number of available OFDM symbols remaining in the first time divided slot from a starting symbol of the PUSCH in the first time divided slot.

* * * * *